United States Patent
Kobayashi et al.

(12) 
(10) Patent No.: US 6,408,323 B1
(45) Date of Patent: Jun. 18, 2002

(54) JOB EXECUTION MANAGING APPARATUS AND COMPUTER-READABLE RECORDING MEDIUM WITH PROGRAM RECORDED THEREIN FOR MAKING A COMPUTER FUNCTION AS A JOB EXECUTION MANAGING APPARATUS

(75) Inventors: Tatsuo Kobayashi, Kanagawa; Hajime Koizumi, Chiba, both of (JP)

(73) Assignee: Justsystem Corporation, Tokushima (JP)

(*) Notice: Subject to any disclaimer, the term of this patent is extended or adjusted under 35 U.S.C. 154(b) by 0 days.

(21) Appl. No.: 09/025,772

(22) Filed: Feb. 19, 1998

(30) Foreign Application Priority Data

Jun. 3, 1997 (JP) ............................................. 9-145018

(51) Int. Cl.$^7$ ................................................. G06F 9/00
(52) U.S. Cl. ...................... 709/100; 345/619; 345/642; 709/106
(58) Field of Search ................................ 709/100–108, 709/310–331; 345/619, 642

(56) References Cited

U.S. PATENT DOCUMENTS 5,606,689 A * 2/1997 Nakagawa ................... 395/622
6,154,218 A * 11/2000 Murase et al. ............... 345/433

FOREIGN PATENT DOCUMENTS

| JP | 63-317881 | 12/1988 |
|----|-----------|---------|
| JP | 1-118923 | 5/1989 |
| JP | 1-118924 | 5/1989 |
| JP | 2-82355 | 3/1990 |
| JP | 4-52859 | 2/1992 |
| JP | 4-84366 | 3/1992 |
| JP | 5-128152 | 5/1993 |
| JP | 5-241804 | 9/1993 |
| JP | 6-282560 | 10/1994 |
| JP | 6-290116 | 10/1994 |
| JP | 7-036649 | 2/1995 |
| JP | 07114568 | 5/1995 |
| JP | 07175811 | 7/1995 |
| JP | 08137652 | 5/1996 |
| JP | 8-24935 | 9/1996 |
| JP | 08263519 | 10/1996 |
| JP | 9-114650 | 5/1997 |

* cited by examiner

*Primary Examiner*—Majid A. Banankhah
(74) *Attorney, Agent, or Firm*—Sughrue Mion, PLLC

(57) ABSTRACT

The job execution managing apparatus according to the present invention comprises an information storing section for storing therein job information comprising a character string defining a user's action to execute a work with given contents prepared for an arbitrary number of jobs and also at least storing therein first relational information correlating job information to a document required when executing the job and second relational information correlating a document to an application program, and an action managing section for selecting, when any of job information displayed on the screen is selected, a document relating to the selected job information referring to the first relational information and also selecting an application program relating to the selected document referring to the second relational information and managing a series of jobs executed with the selected application program.

27 Claims, 11 Drawing Sheets

FIG.3

|   | ACTION NAME | CHOICE | ROOT | POINTER TO SUBACTIONS |
|---|---|---|---|---|
| 1 | PREPARE A PLAN | 1 | 1 | 18,19 |
| 2 | MEETING IN FIRM | 1 | 1 | — |
| 3 | BUSINESS TRIP | 1 | 1 | 6,7,8,9,10 |
| 4 | PREPARE A REPORT | 1 | 1 | — |
| 5 | PREPARE A BILL | 1 | 1 | — |
| 6 | APPLY FOR BUSINESS TRIP | 1 | 0 | 12,13 |
| 7 | PREPARE DATA | 1 | 0 | 14,15 |
| 8 | SCHEDULE A CONFERENCE | 1 | 0 | — |
| 9 | CONTACT THE OTHER PARTY | 1 | 0 | — |
| 10 | RESERVATION FOR LODGEMENT | 1 | 0 | — |
| 11 | REPORT OF BUSINESS TRIP | 1 | 0 | — |
| 12 | PUT ON TO-DO LIST | 1 | 0 | — |
| 13 | PREPARE AND SEND | 1 | 0 | — |
| 14 | PREPARE A PLAN | 1 | 0 | — |
| 15 | PREPARE AN ESTIMATE | 1 | 0 | — |
| 16 | REGISTER IN ADDRESS NOTE | 1 | 1 | — |
| 17 | · | · | · | · |
| · | · | · | · | · |
| · | · | · | · | · |
| 20 | TV CONFERENCE | 1 | 1 | 21,22,23 |
| 21 | TV CONFERENCEE WITH TOKYO BRANCH OFFICE | 1 | 0 | — |
| 22 | TV CONFERENCEE WITH TOKUSHIMA HEAD OFFICE | 1 | 0 | — |
| 23 | TV CONFERENCEE WITH NEW YORK BRANCH OFFICE | 1 | 0 | — |
| · | · | · | · | · |
| · | · | · | · | · |
| · | · | · | · | · |
| 28 | PREPARE SPECIFICATIONS | 0 | 1 | 31,32 |
| 29 | PREPARE ARGUMENT, AMENDMENT | 0 | 1 | 35,36 |
| · | · | · | · | · |
| · | · | · | · | · |
| · | · | · | · | · |

FIG.4

| ACTION NAME | | DOCUMENT NAME | APPLICATION NAME | ACTION INFORMATION |
|---|---|---|---|---|
| · · · | · · · | · · · | · · · | · · · |
| 13 | PREPARE AND SEND | BUSINESS TRIP APPLICATION FORM | WORD PROCESSOR SOFTWARE | A |
| 14 | PREPARE A PLAN | PLAN | WORD PROCESSOR SOFTWARE | B |
| 15 | PREPARE AN ESTIMATE | ESTIMATE | SPREADSHEET SOFTWARE | C |
| 16 | REGISTER IN ADDRESS NOTE | ADDRESS NOTE | DATABASE SOFTWARE | — |
| · · · | · · · | · · · | · · · | · · · |
| 21 | TV CONFERENCE WITH TOKYO BRANCH OFFICE | — | TV CONFERENCE SOFTWARE | D |
| 22 | TV CONFERENCE WITH TOKUSHIMA HEAD OFFICE | — | TV CONFERENCE SOFTWARE | E |
| 23 | TV CONFERENCE WITH NEW YORK BRANCH OFFICE | — | TV CONFERENCE SOFTWARE | F |
| · · · | · · · | · · · | · · · | · · · |

FIG.6

600 ACTION REGISTRATION LIST

601
- ☑ PREPARE A PLAN
- ☑ MEETING IN FIRM
- ☑ BUSINESS TRIP
- ☑ PREPARE A REPORT
- ☑ PREPARE A BILL
- ☑ TV CONFERENCE
- ☐ PREPARE SPECIFICATIONS
- ☐ PREPARE ARGUMENT, AMENDMENT
- ☑ ADD IN ADDRESS NOTE
- ☐ .
- ☐ .
- ☐ .

[ OK ]  [ CANCEL ]

FIG.8A

| ACTION LIST |
|---|
| PREPARE A PLAN |
| MEETING IN FIRM |
| BUSINESS TRIP |
| PREPARE A REPORT |
| PREPARE A BILL |
| ADD IN ADDRESS NOTE |
| TV CONFERENCE |

| ACTION LIST | |
|---|---|
| PREPARE A PLAN | |
| MEETING IN FIRM | |
| BUSINESS TRIP | APPLY FOR BUSINESS TRIP |
| PREPARE A REPORT | SCHEDULE A CONFERENCE |
| PREPARE A BILL | CONTACT THE OTHER PARTY |
| ADD IN ADDRESS NOTE | RESERVATION FOR LODGEMENT |
| TN CONFERENCE | REPORT OF BUSINESS TRIP |

| ACTION LIST | | |
|---|---|---|
| PREPARE A PLAN | | |
| MEETING IN FIRM | | |
| BUSINESS TRIP | APPLY FOR BUSINESS TRIP | PREPARE AND SEND |
| PREPARE A REPORT | SCHEDULE A CONFERENCE | PUT ON TO-DO LIST |
| PREPARE A BILL | CONTACT THE OTHER PARTY | |
| ADD IN ADDRESS NOTE | RESERVATION FOR LODGEMENT | |
| TV CONFERENCE | REPORT OF BUSINESS TRIP | |

FIG.9

BUSINESS TRIP APPLICATION FORM

TO.

NAME: SALES DEPARTMENT
                              FIRST SALES SECTION
                                    ○○ ○○

I APPLY FOR BUSINESS TRIP AS FOLLOWS

1. PERIOD:
2. DESTINATION:
3. PURPOSE:
4. EXPENSE:

END

FIG.10

BUSINESS TRIP APPLICATION FORM

TO. Mr./Ms.○○ ○○
    CHIEF OF FIRST SALES SECTION

NAME: SALES DEPARTMENT

SEND A MAIL?

Yes    No     1000

1. PERIOD:
2. DESTINATION:
3. PURPOSE:
4. EXPENSE: ¥○○○○○

END

FIG.11

BUSINESS TRIP APPLICATION FORM

TO. Mr./Ms.○○ ○○
   CHIEF OF FIRST SALES SECTION

SELECT DESTINATION FOR MAIL

Mr.○○○, FIRST SALES SECTION CHEF
Mr.○○○, ACCOUNTING SECTION CHEF

SEND    CANCEL

1. PERIO
2. DESTI
3. PURPO
4. EXPENSE: ¥○○○○○

1100

END

FIG.12A

| ACTION LIST | 800 |
|---|---|
| TV CONFERENCE | 97/05/31 |
| BUSINESS TRIP | 97/06/01 |
| PREPARE A PLAN | 97/06/04 |
| MEETING IN FIRM | 97/06/05 |
| PREPAREA A REPORT | 97/06/10 |

FIG.12B

| ACTION LIST | 800 | | | |
|---|---|---|---|---|
| TV CONFERENCE | 97/05/31 | TV CONFERENCE WITH TOKYO BRANCH OFFICE | 97/05/31 | |
| BUSINESS TRIP | 97/06/01 | TV CONFERENCE WITH TOKUSHIMA HEAD OFFICE | 97/06/03 | |
| PREPARE A PLAN | 97/06/04 | TV CONFERENCE WITH NEW YORK BRANCH OFFICE | 97/06/07 | |
| MEETING IN FIRM | 97/06/05 | | | |
| PREPARE A REPORT | 97/06/10 | | | |

JOB EXECUTION MANAGING APPARATUS AND COMPUTER-READABLE RECORDING MEDIUM WITH PROGRAM RECORDED THEREIN FOR MAKING A COMPUTER FUNCTION AS A JOB EXECUTION MANAGING APPARATUS

FIELD OF THE INVENTION

The present invention relates to a job execution managing apparatus which can select a particular application program or a particular document according to contents of a job (work) using a computer and also can automatically make the computer execute all or a portion of the processing corresponding to contents of the job and to a computer-readable recording medium with a program stored therein for making a computer function as a job execution managing apparatus recorded therein.

BACKGROUND OF THE INVENTION

When carrying out a job with a computer, it is necessary to select and execute an application program corresponding to contents of the job. For instance, it is necessary to select a word processor software when a document is to be prepared, or a browser when accessing a homepage through the Internet to execute desired processing.

When a document previously prepared is to be used, for instance, a list of files is prepared, and a user selects a desired file name from the file names displayed in the list form to execute desired processing.

However, in the conventional technology as described above, knowledge is required as to which application program suited to contents of the job is, and sometimes a user can not immediately determine which application program is to be used.

Also in the conventional technology described above, document management is executed centering on file names, and for this reason it is necessary to select a file name after confirming contents or applications of the document, so that execution of a job can not immediately be started. Namely, in the conventional technology, it is necessary to provide an improved method of managing file names or files so that contents or application of each document can immediately be understood, and if it is impossible to immediately understand contents of each document from a file name, it is necessary to open the file for ascertaining contents of the file. For this reason, sometimes a document different from a truly required one may be selected, which is very inconvenient in practical operation.

Furthermore, after a desired document is selected, generally the document is sent as a mail or printed. Namely, a document is searched out through retrieval or other operations to execute some job using the document. In the conventional technology, however, documents are managed at a dimension substantially different from a level of practical application, a user is required to give some instruction for achieving an object to a computer (or to an application program), and must perform operations several times.

SUMMARY OF THE INVENTION

It is an object of the present invention to make it possible to automatically select a particular application program or a document and automatically execute all or a portion of the processing corresponding to contents of the job by a computer.

Namely, with the job execution managing apparatus according to the present invention, a character string indicating a user's action to execute a job with given contents is defined as job information; job information is prepared for a given number of jobs; prepared job information is divided and stored in the forms of a first job information specifying execution of a particular application program and a second job information specifying the first job information, and further first relational information correlating the first job information to a corresponding particular application program and second relational information correlating the second job information to the first job information are stored. And, of the first and second job information, prespecified first and/or second job information is read out and displayed, and when the displayed first job information is selected, the first relational information is referred to and the corresponding application program is executed, while the second job information is selected, second relational information is referred to and the corresponding first job information is displayed.

Namely, with the job execution managing apparatus according to the present invention, a character string indicating a user's action to carry out a job with given contents is defined as job information; job information is prepared for an arbitrary number of jobs; the prepared job information is divided and stored in the forms of a first job information specifying execution of a particular program and a document to be used and a second job information specifying first job information, and also first relational information correlating the first job information to a corresponding particular programs as well as to a document, and second relational information correlating the second job information to the first job information are stored. And, of the first and second job information, prespecified first and/or second job information are read out and displayed, and when the displayed first job information is selected, a corresponding application program is executed by referring to the first relational information and using a corresponding document, and when the second job information is selected, the corresponding first job information is displayed referring to the second relational information.

With the job execution managing apparatus according to the present invention, further to make it possible for a user to select whether the first and second job information are to be displayed or not, only second job information is displayed in a list form, and of the listed second job information, displayed-selected information is appended to the second job information selected by the user, and the second job information with display-selected information appended thereto is displayed. When the second job information is selected, the first job information is displayed according to the second relational information.

With the job execution managing apparatus according to the present invention, job execution information defining an execution procedure for a corresponding application program is appended to the first job information, and the corresponding application program is executed according to the job execution information.

With the job execution managing apparatus according to the present invention, a character string indicating a user's action to carry out a job with given contents is defined as job information, the job information is prepared for an arbitrary number of jobs, the job information is divided and stored in the forms of a first job information specifying execution of a particular application program, a second job information specifying execution of a particular application program and a document to be used, and a third job information specifying the first job information or second job information according to contents of the job corresponding to the prepared job information, and further first relational information correlating the first job information to corresponding a particular application program, second relational information correlating the second job information to a corresponding application program as well as to a document to be used, and third relational information correlating the third job information to the first or second job information. And of the first, second, and third job information, prespecified first, second and/or third job information are read out and displayed, and when the displayed first job information is selected, a corresponding application program is executed by referring to the first relational information, and when the second job information is selected, a corresponding application program is executed by referring to the second relational information and also using the corresponding document, and further when the third job information is selected, the corresponding first or second job information is displayed by referring to the third relational information.

With the job execution managing apparatus according to the present invention, to make it possible to specify whether the first, second, and third job information are to be displayed or not, only the third job information is displayed in a list form, and of the listed third job information, display-selected information is appended to the third job information selected by a user, and the third job information with display-selected information appended thereto is displayed. And, when the third job information is selected, the first or second job information is displayed according to the third relational information.

With the job execution managing apparatus according to the present invention, job execution information defining a execution procedure for a corresponding application program is appended to the first and second job information, and the corresponding application program is executed according to the job execution information.

With the computer-readable recording medium according to the present invention, it is possible to make a computer function as the job execution managing apparatus by making the computer execute a recorded program.

Other objects and features of this invention will become clear from the following description with reference to the accompanying drawings.

BRIEF DESCRIPTION OF THE DRAWINGS

FIG. 3 is an explanatory view showing action-names relational information stored in an information storing section in the job execution managing apparatus according to the embodiment;

FIG. 4 is an explanatory view showing action-execution relational information stored in the information storing section in the job execution managing apparatus according to the embodiment;

FIG. 6 is an explanatory view showing an example of a list of registered actions displayed on the screen in the registration processing of an action name shown in FIG. 4;

FIG. 8A to FIG. 8C are explanatory views showing examples of displaying action names and also showing processes with which action names are chosen in the job execution managing apparatus according to the embodiment;

FIG. 9 is an explanatory view showing an example of a document "Business trip application form" used for executing an action shown in the action name "Prepare and send" in the job execution managing apparatus according to the embodiment;

FIG. 10 is an explanatory view showing a state of executing the act ion shown in the action name "Prepare and send" in the job execution managing apparatus according to the embodiment;

FIG. 11 is an explanatory view showing a state of executing the action shown in the action name "Prepare and send" in the job execution managing apparatus according to the embodiment; and FIG. 12A and FIG. 12B are explanatory views showing examples of displaying action names appending thereto time information in the job execution managing apparatus according to the embodiment.

DESCRIPTION OF THE PREFERRED EMBODIMENTS

Detailed description is made hereinafter for an embodiment of a job execution managing apparatus and a computer-readable recording medium with a program stored therein for making a computer function as a job execution managing apparatus with reference to the related drawings.

Outline of the Present Invention

The job execution managing apparatus and the computer-readable recording medium with a program recorded therein for making a computer function as a job execution managing apparatus can start, for instance, execution of a particular application program to make it execute a specified processing and also can make a particular application program execute processing to a particular document according to contents of a job which a user must carry out, whereby the necessity for user to directly choose any application program or document can be eliminated.

Jobs described herein include a job such as "Business trip" and works such as "Prepare business trip application form" or "Prepare business trip report" which is derivative of the job "Business trip". In the present invention, each of the jobs and works is defined as an action, and "Business trip" and "Prepare business trip application form" are defined as an action name (job information) for each action. Then these action names are managed in a hierarchical structure, and when someone is to go on a business trip, for instance, a user chooses action names one by one from the action name "Business trip" toward the bottom of the hierarchy, so that works to be carried out before and after the business trip are displayed as action names. Then, when the action name "Prepare business trip application form" is chosen, the form for a business trip application is automatically displayed on the screen of the computer, and when preparation thereof is ended, the form is automatically sent as a mail to a section to which the business trip application form has to be sent.

Namely, in the present invention, by choosing any action name, the particular application program is initialized, whereby a state in which a desired work can immediately be started is made available to the user, and also by choosing any action name, the desired processing can be executed with the application program.

Next, further detailed description is made for the job execution managing apparatus and the computer-readable recording medium with a program for making a computer function as the apparatus recorded therein according to the present invention in the order of [Hardware configuration of the job execution managing apparatus], [Software configuration of the job execution managing apparatus], and [Operations of the job execution managing apparatus]

Hardware Configuration of the Job Execution Managing Apparatus

Figure 1:
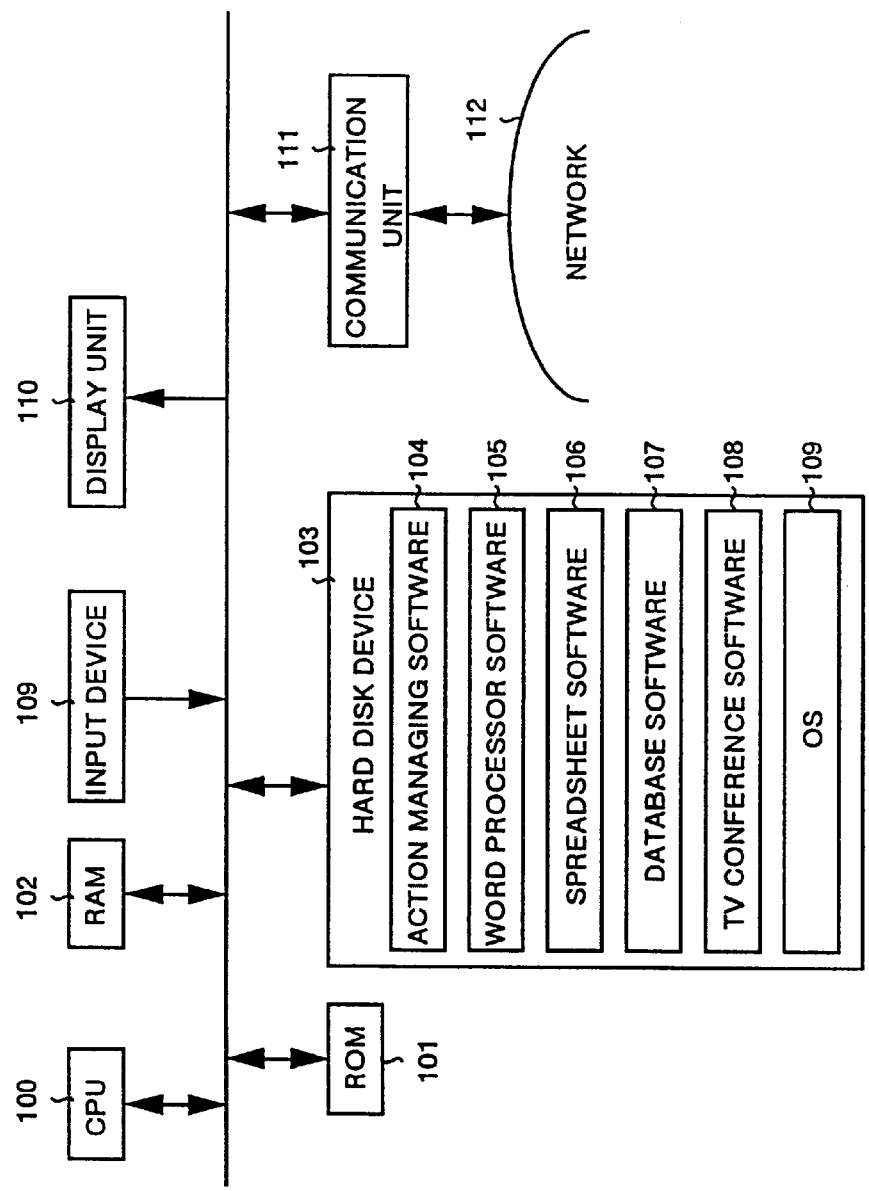
FIG. 1 is a block diagram showing hardware configuration of a computer for realizing a job execution managing apparatus according to an embodiment of the present invention.

FIG. 1 is a block diagram showing hardware configuration of a computer for realizing the job execution managing apparatus according to an embodiment of the present invention. In FIG. 1, designated at the reference numeral 100 is a CPU, at 101 a ROM, at 102 a RAM, at 103 a hard disk drive, at 109 an input device such as a keyboard and a mouse, at 110 a display unit such as a CRT, and at 111 a communication unit for controlling communications with other computers each connected to a network 112 respectively.

Stored in the hard disk unit 103 are application programs such as action managing software 104 for managing the action names and actions, a word processor software 105, spreadsheet software 106, database software 107, and TV conference software 108; and an OS (Operating system) 109. Those programs are read out by the CPU 100 to be executed.

Software Configuration of the Job Execution Managing Apparatus

Figure 2:
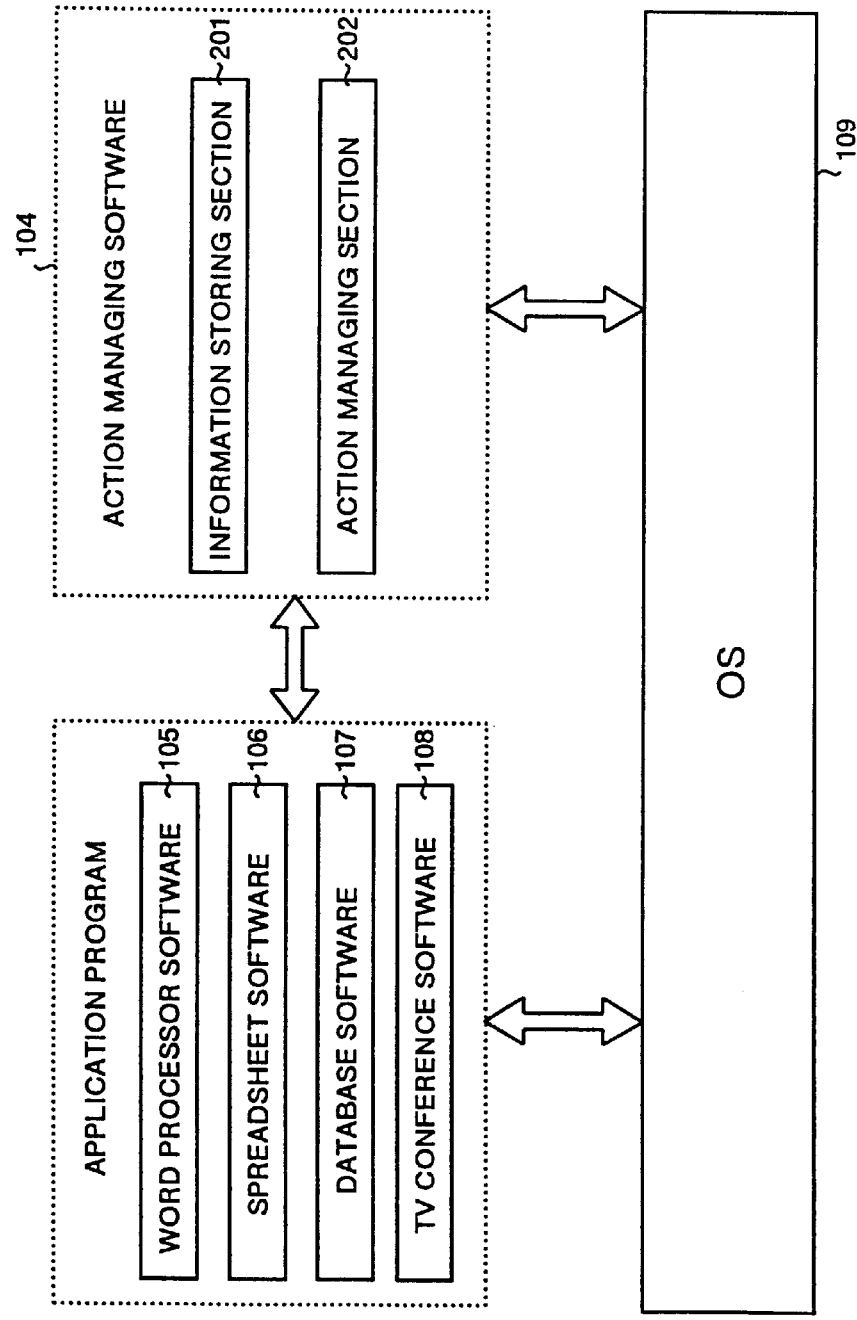
FIG. 2 is a block diagram of the job execution managing apparatus according to the embodiment.

FIG. 2 is a block diagram of the job execution managing apparatus according to the embodiment, and shows a relation among the action managing software 104, word processor software 105, spreadsheet software 106, database software 107, TV conference software 108, and OS 109.
(1) OS The OS 109 provides an environment in which the apparatus shown in FIG. 1 can effectively be made use of, and performs each processing for managing the action managing software 104, word processor software 105, spreadsheet software 106, database software 107, and TV conference software 108 or the like, managing I/O of data, managing allocation of the memory thereto, and for screen display or the like.
(2) Application Programs In this embodiment, although the word processor software 105, spreadsheet software 106, database software 107, and the TV conference software 108 are taken up as application programs other than the action managing software 103 described later, the application programs are not restricted thereto. It should be noted that the word processor software 105 is supposed to have not only a function of creating documents but also a function for electronic-mail transaction.
(3) Action Managing Software The action managing software 104 has an information storing section 201 and an action managing section 202.
(1) Information Storing Section 201

The information storing section 201 stores therein action-names relational information (FIG. 3) and action-execution relational information (FIG. 4) described below with reference to the related drawings.
a. Action-Names Relational Information FIG. 3 is an explanatory view showing the action-names relational information. The action-names relational informa-tion shown in FIG. 3 defines a relation between preset action names and manages action names using the hierarchy structure.

In FIG. 3, the column "Action name" stores therein action names indicating each job for carrying out a certain job. The column "choice" indicates the fact as to whether an action name has been chosen or not in action registration processing described later, "1" indicates the action name that has been chosen, so that only this action name is displayed on the screen. The column "Root" indicates the fact as to whether any action name is positioned at the top of the hierarchical structure or not, and the case of "1" indicates the fact that the action name is positioned at the top thereof, the case of "0" indicates the fact that the action name is positioned in some other hierarchy. The column "Pointer to sub-actions" indicates the action names that are positioned below each action name toward the bottom of the hierarchy if there are some action names positioned below each action name. It should be noted that the action names are classified to one specifying execution of a particular application program (e.g. Action name "TV conference with Tokyo branch office" Refer to FIG. 4 below), one specifying execution of a particular application program as well as a document to be used (e.g. Action name "Prepare and send", Refer to FIG. 4 below), and one specifying some other action name (a case where a pointer is displayed in the column of "Pointer to sub-actions"; e.g. Action name "Apply for business trip").

More specific description is made herein for a relation among action names by taking up the third action name "Business trip" as an example. The action name "Business trip" is found, from the fact that "1" is stored in the column "Root", to be positioned at the top of the hierarchy structure. Then, when the column "Pointer to sub-actions" is looked at, it is found, because "6, 7, 8, 9, 10" is displayed therein, that some other action names are registered below the action name "Business trip" toward the bottom of the hierarchy. Then, when the sixth action name, for example, is looked at according to the display of the column "Pointer to sub-actions", the action name "Apply for business trip" can be found. This action name "Apply for business trip" is positioned at the lower position from the action name "Apply for business trip", so that "0" is displayed in the column "Root". Then, when the column "Pointer to sub-actions" is looked at, "12, 13" is displayed, whereby it is understood that some other action names are further registered below the action name "Apply for business trip" in the hierarchy. When the 13th action name is looked at, for instance, according to the display in the column "Pointer to sub-actions", the action name "Prepare and send" can be found. This action name "Prepare and send" has "0" displayed in the column "Root" and has no pointer indicating the lower action names displayed in the column "Pointer to sub-actions", whereby it is understood that the action name "Prepare and send" is positioned at the bottom of the hierarchy. It is possible to group some action names for each job (described as "action group" hereinafter) by appending "Pointer to sub-actions" to each action name, and further the action names in an action group can be managed using the hierarchy structure.

It should be noted that, in FIG. 3, a display of "Pointer to sub-actions" can arbitrarily be changed. For example, by registering "14" to the column "Pointer to sub-actions" of the action name "Business trip", the action name "Prepare planning document" can newly be correlated thereto.
b. Action-Execution Relational Information FIG. 4 is an explanatory view showing action-execution relational information. The action-execution relational information shown in FIG. 4 relates to an action name not displaying "Pointer to sub-actions" therein described using FIG. 3, namely an action name specifying execution of a particular application program as well as to an action name specifying execution of a particular application program and a document to be used.

In FIG. 4, correlated to an action name specifying execution of a particular application program are the corresponding particular application program and execution information (or storage addresses for execution information) defining a series of sequence for processing executed by the particular application program. On the other hand, correlated to an action name specifying execution of a particular application program as well as a document to be used are the documents, application programs dealing with the documents, and execution information (or storage addresses for execution information) defining a series of sequence for processing executed by the particular application program using the document. It should be noted that execution information is not required to be correlated thereto as far as a case where an action name is only the name indicating initiation of any application program or the like.

For example, correlated to the 13th action name "Prepare and send" are a document "Business trip application form", "Word processor software", and the execution information "A". For instance, the execution information "A" of the action name "Prepare and send" defines, when preparation of the document "Business trip application form" is to be ended, a sequence of commands for sending the prepared business trip application form to a person in charge by a mail.

Accordingly, action names are chosen one by one in the order from the action name "Business trip", and when the action name "Prepare and send" is finally chosen, the word processor software 105 automatically enters the state in which a business trip application form is ready to be prepared. Then, preparation of the form is completed, the prepared form can be automatically sent as a mail.

It should be noted that the information storing section 201 is provided in a writable/readable recording medium such as the RAM 102 and the hard disk drive 103. Each document correlated to an action name is also provided in a writable/readable recording medium.

(2) Action Managing Section

Description is made for the action managing section 202 in the action managing software 104 again with reference to FIG. 2. The action managing section 202 manages the action-names relational information shown in FIG. 3 and also manages processing steps from initiation of an application program to the end thereof according to the action-execution relational information shown in FIG. 4. Also, the action managing section 202 provides controls over processing for displaying the action names shown in FIG. 3 on the screen. It should be noted that description is made later on how to carry out the screen display.

Operations in the Job Execution Managing Apparatus

Next, description is made for operations in the job execution managing apparatus in the order of (1) Registration of action names and (2) Execution of actions.

(1) Registration of Action Names

Figure 5:
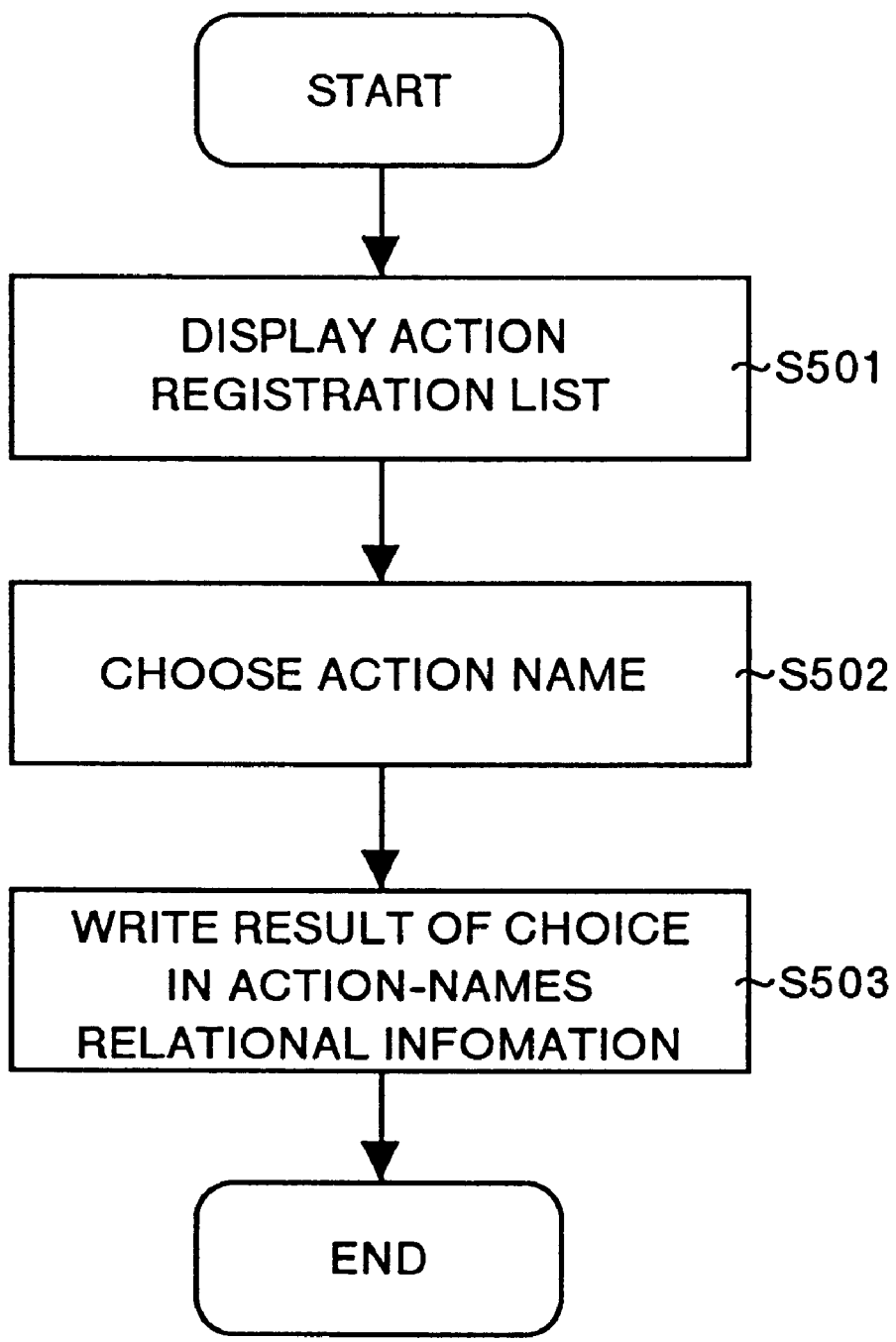
FIG. 5 is a flowchart showing the processing sequence for registering an action name in the job execution managing apparatus according to the embodiment.

All the action names in the action-names relational information shown in FIG. 3 may be displayed on the screen, but by setting action names to be selectable, only action names relating to actions that the user usually carries out can be displayed thereon. FIG. 5 is a flowchart showing the processing for registering an action name.

It is assumed herein that the action managing software 104 has been started. The action managing section 202 displays, when having received an instruction for requesting registration of an action name from the input device 109, a registered list of actions 600 as shown in FIG. 6 on the screen (S501).

The action names included in the registered list of actions 600 displayed on the screen in step S501 are specified as ones positioned at the top of the hierarchy described in FIG. 3. However, action names in the lower hierarchy can not always be displayed, and for example, all of the action names may be displayed in a tree structure.

Then, the user clicks a check box 601 in the displayed registered list of actions 600 on the screen with a mouse or the like and chooses an action name to be displayed thereon with the check mark marked in the box (S502). It is needless to say that, when the user wants to cancel the chosen action name, the check mark may be deleted by removing the check from the check box 601 with a mouse.

Then, when the box of "OK" in the registered list of actions 600 is clicked with the mouse, the action managing section 202 writes a result of the choices in the action-names relational information shown in FIG. 3 according to the result of user's choice (S503). To be more specific, when registration of the action name, for instance, "Business trip" is chosen in the step S502, the corresponding display of the column of "Choice" in FIG. 3 is corrected from "0" to "1". The action managing section 202 checks whether any related action names exist at lower positions from the action name "Business trip" or not according to information in the column of "Pointer to sub-actions", and if it is checked that any information exists there, the display in the column corresponding to the action name is rewritten from "0" to "1". On the other hand, when deletion of the action name such as "Prepare Specifications" has been chosen, processing reverse to the case of registration is executed, namely the display in the column "Choice" in FIG. 3 is corrected from "1" to "0".

As described above, only by choosing whether screen display is to be performed or not using any action name at the top of the hierarchical structure, it is possible to choose whether all the action group to which the action name at the top thereof belongs is to be displayed on the screen or not, whereby registration processing can be simplified.

It should be noted that, in the above description, "1" or "0" is set to be displayed in the column of "Choice" shown in FIG. 3 for action names other than the action names at the top thereof, but this display may be carried out only to the action names at the top thereof. That is because, even in the case described above, it is possible to display the lower action names using the display in the column "Pointer to sub-actions". It should be noted that, for action names in the lower hierarchy, it is also possible to set whether action names in the lower hierarchy are to be displayed on the screen or not by displaying "1" or "0" in the column of "Choice".

Although detailed description is omitted herein, it is needless to say that new action names and documents or the like can be registered to the action-names relational information in FIG. 3 and the action-execution relational information in FIG. 4.

(2) Execution Processing of Actions

Figure 7:
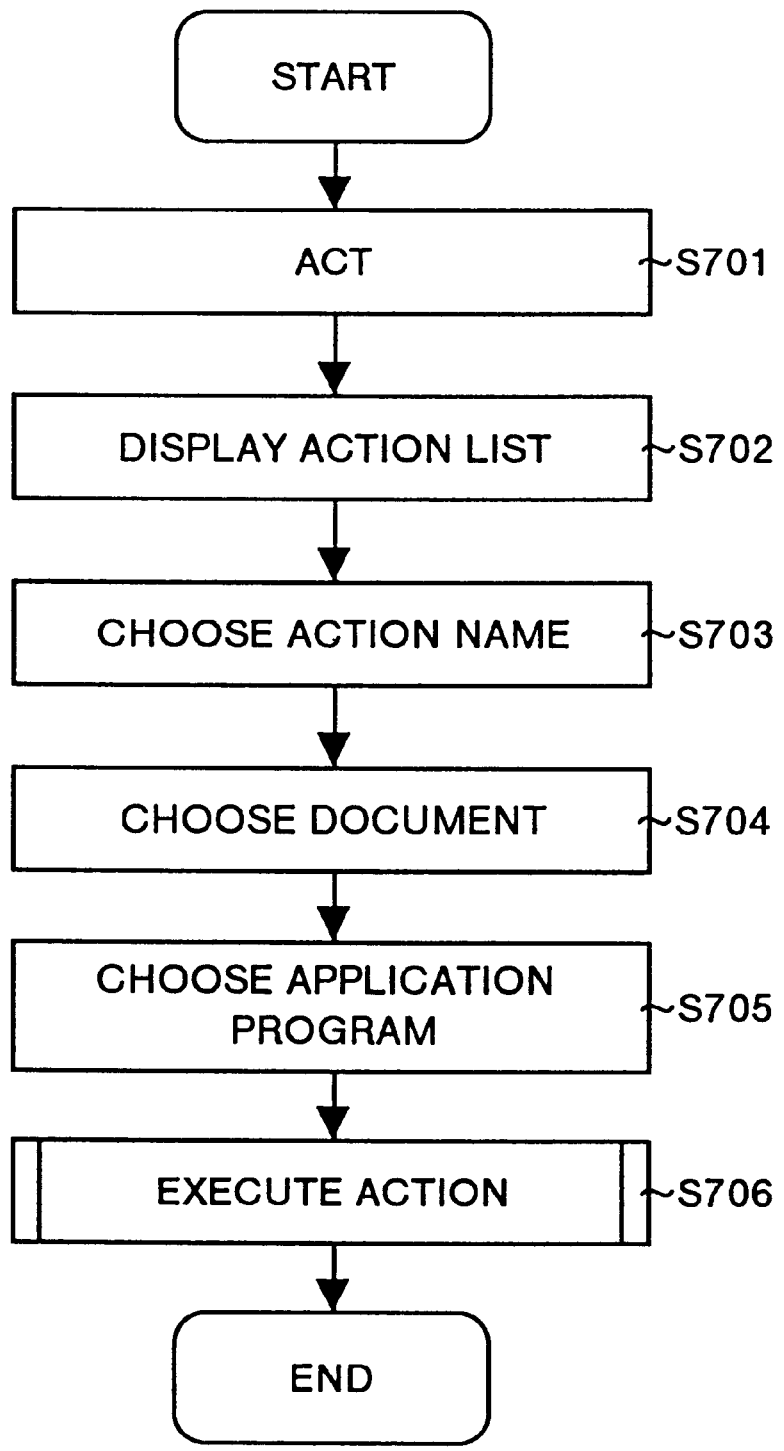
FIG. 7 is a flowchart showing operations in the job execution managing apparatus according to the embodiment.

Next, description is made for processing of executing actions using the action name registered in the registration processing of action names described above. FIG. 7 is a flowchart showing operations in the job execution managing apparatus according to the embodiment of the present invention.

At first, the application managing software 104 is started due to actuation of a computer shown in FIG. 1 or due to an instruction from the input device 109 (S701). When the application managing software 104 is started, the action managing section 202 refers to the column of "Root" indicating the action-names relational information shown in FIG. 3, reads out the action names with "1" indicated in the column of "Root", and displays those names as an action list 800 on the screen (S702).

FIG. 8A to FIG. 8C are explanatory views showing examples of displaying action names and also showing processes with which action names are selected. The action managing section 202 first displays, as shown in FIG. 8A, action names on the screen. The user refers to the displayed action list 800 and executes a desired action. Description herein assumes the action based on the condition that a person who must go on a business trip to carry out some research required for the business is regarded as a user who applies for the business trip to his (her) boss.

When the action list 800 shown in FIG. 8A is displayed on the screen, then, one of the action names is chosen (S703). At first, when the action name "Business trip" is chosen in the action list 800 in FIG. 8A, the action managing section 202 refers to the action-names relational information in FIG. 3 to display on the screen the action names corresponding to the pointers displayed in the column of "Pointer to sub-actions" as shown in FIG. 8B.

Then, when the action name "Apply for business trip" is chosen in the action list 800 in FIG. 8B, the action managing section 202 refers to the action-names relational information in FIG. 3 to display on the screen the action names corresponding to the pointers displayed in the column of "Pointer to sub-actions" as shown in FIG. 8C.

Further, when the action name "Prepare and send" is chosen in the action list 800 in FIG. 8C, the action managing section 202 refers to the column of "Pointer to sub-actions" corresponding to the action name "Prepare and send" in the action-names relational information in FIG. 3. But it is found that no pointer indicating an action name in the lower hierarchy is displayed in the column of "Pointer to sub-actions", then the action managing section 202 refers to the action-execution relational information in FIG. 4. In FIG. 4, "Business trip application form" as a document is correlated to the action name "Prepare and send", and a word processor software is correlated to the document "Business trip application form". Further, also set in the action name "Prepare and send" is the execution information "A".

Then, the action managing section 202 specifies, according to the action-execution relational information in FIG. 4, "Business trip application form" as a document in step S704 in FIG. 7, and specifies the word processor software 105 in step S705. Then, the action managing section 202 actuates the word processor software 105 to display the Business trip application form shown in FIG. 9 on the screen, and executes actions indicated by the action name "Prepare and send" (S706).

Description of execution of actions in step S706 assumes herein execution of the action indicated by the action name "Prepare and send".

When the action name "Prepare and send" is specified and the document "Business trip application form" shown in FIG. 9 is displayed on the screen, the user completes the application form through the word processor software 105. When preparation of the application form is completed, the user instructs termination of operations of the word processor software. Correlated, herein, to the action name "Prepare and send" is the execution information "A" in which a sequence of processing for sending the prepared document "Business trip application form" as a mail at the time of ending the word processor software 105 is described.

The action managing section 202 displays, when having received End instruction from the word processor software 105, a dialog box 1000 to check whether the mail is to be sent or not as shown in FIG. 10 by referring to the execution information "A". Herein, the action managing section 202 terminates the word processor software 105 when the "NO" key is clicked with a mouse. On the other hand, when the "Yes" key is clicked, the dialog box 1100 for choosing a destination of the mail is displayed as shown in FIG. 11.

When destination of the mail is chosen and the send key is clicked in FIG. 11, the word processor software 105 sends the prepared business trip application form to the chosen destination. With this operation, execution of the action indicated by the action name "Prepare and send" is completed.

It should be noted that time information, namely dates on which actions have to be executed, can also be managed by appending the date to each action name in the action-names relational information shown in FIG. 3. FIG. 12A and FIG. 12B are explanatory views showing examples of displaying the action list 800 when time information is appended to action names.

When time information is appended to action names, the action managing section 202 displays the action list 800 in which action names are arranged in the order of date. Time information can be appended to the action names when they are registered to the action list 800, and can also be appended not only to the action names positioned in the top of the hierarchy structure but also to those positioned at the bottom thereof (refer to FIG. 12B).

Description is made herein for operations in the job execution managing apparatus in a case where time information is appended to action names. The action managing section 202 can display, before the time information (date) appended to each action name expires, a notice mentioning that the date is near. Supposing the current date is 31st of May, at first the user chooses the action name "TV conference" on the scheduled time.

When the action name "TV conference" has been chosen, the action managing section 202 displays, by referring to the action-names relational information in FIG. 3, action names corresponding to the pointers displayed in the column "Pointer to sub-actions" together with the time information appended thereto on the screen as shown in FIG. 12B.

As shown in FIG. 12B, the action that has to be carried out on 31-st of May is the action name "TV conference with Tokyo branch office". When the action name "TV conference with Tokyo branch office" is chosen by the user, the action managing section 202 specifies the TV conference software 108 correlated thereto by referring to the action-execution relational information in FIG. 4 to provide control over execution of the action according to execution information "D". Herein, the execution information "D" indicates processing such as setting of equipment for the TV conference or connection of lines.

Then, the action managing section 202 displays, when the action is finished, some sort of sign to the effect that the action relating to the corresponding action name "TV conference with Tokyo branch office" has been finished on the action list. For example, an end mark is added to the action name "TV conference with Tokyo branch office", or some setting is provided so that the action name will not be chosen, further, the action name "TV conference with Tokyo branch office" is deleted from the action list 800. In addition, the action name of the action that has been carried out and the time information may be stored in the information storing section 201 as end information.

It should be noted that, although there is described only one example of managing action names according to the time information above, some other managing methods may be employed.

As described above, with the job execution managing apparatus according to the embodiment of the present invention, a user chooses any action name indicating an action to be executed, and with this operation, the apparatus can make a computer execute processing corresponding to the action. Namely, when any action name (e.g. "Prepare and send") specifying execution of an application program and a document to be used is chosen, the application program that can deal with the document to be used is immediately started to be ready for work. When any action name (e.g. "TV conference with Tokyo branch office") specifying execution of an application program is chosen, the application program is immediately started and the processing corresponding to the action is automatically executed.

Accordingly, with the job execution managing apparatus according to the embodiment of the present invention, by choosing an action name, a corresponding work with a computer is ready to be started, whereby it is possible to eliminate such inconveniences that a user has to think about which application program is the most suitable for the work to be carried out or he has to search where the document to be used is stored, and for this reason, workability can be improved.

It should be noted that description has been made in the embodiment assuming that a function of sending mails is provided in the word processor software 105, but if the function is not provided therein, the action managing software 104 may be set to send mails by itself.

For this reason, it is desirable to give a mail sending/receiving function to the action managing software 104. Appended to this mail sending/receiving function can not only by a function of displaying received mails in a list form but also functions of replying to mails as well as of enabling display of notice mails in a tree form. With those functions, it is possible to easily check a history of sending/receiving mails or exchanging information. A function of displaying contents of a received mail with simple viewer or a function of checking contents of the file attached to a mail can be provided in the mail sending/receiving function. Further, a function of searching a mail by defining selection criteria such as a sender or a receiver can be provided therein.

A function of enabling registration of a new action name in the action list 800 according to an electronic mail from the third person may also be provided in the action managing section 202. Supposing that a user A is to order a user B to go on business, the user A prepares a mail to the effect that the user B is ordered to go on a business trip, sets a flag for making the action managing section 202 execute registration processing of the action name "Business trip" in the mail, and sends the mail to the user B. Then, the action managing section 202 in the computer in the side of the user B checks that the flag ordering the registration processing of the action name "Business trip" is set in the mail from the user A to register the action name "Business trip" in the action list 800. When the action name "Business trip" is to be registered in the action list 800, all of the action names included in the action group to which the action name "Business trip" belongs is programmed to be registered in the action list 800.

As the action-execution relational information shown in FIG. 4, description has been made for one correlating one action name to one document, but one action may be correlated, not to one document, but to one document group (binder) correlating all types of document thereto.

Given to the action managing software 104 can not only be the function of managing actions described above but also various functions (1) to (9) described below.

(1) Function of Displaying Different Types of Information in a Single Form

This function is used for displaying different types of information document such as a mail, a schedule, a file, and URL in a list form. For displaying one of them, any information document can be displayed, for example, in a tree form or managed correlating to each information document.

(2) Function of Setting/Displaying Conditions for Collection

This function can set, for displaying the information documents in a list form, collecting conditions and is used for automatically collecting and displaying information documents satisfying the set collecting conditions.

(3) Multiview Function by Setting a Plurality of Collecting Conditions

This function is used for classifying, by setting a plurality of collecting conditions, documents on the hardware to each condition to be displayed in a list form. By setting conditions such as "List of mails from Sales Department" and "List of mails from Accounting Department", two windows with one displaying thereon the mails from the sails department and the other one displaying thereon the mails from the accounting department are opened and the mails received in both of the windows are displayed in a list form.

(4) Functions of Retrieval and Extraction

This function is used, by setting arbitrary conditions, for obtaining target information out of a large amount of information. For example, to the condition of "Document for . . . conference", by assuming a scene of an office, a term of "Document" is extended to terms such as "Proceedings, Report, Agenda", so that retrieval processing suitable to the intention of the user can be executed. Also, when the meaning of an inputted condition is found unclear and is difficult to be specified, an appropriate response can be made to the user.

(5) History Function

This function is used for displaying in a list form a history that the information documents displayed in a list form were activated. The history can be set so that the history can automatically be generated or deleted. As for deletion, it is designed to delete information in the order from the older one, but the timing of deletion can be set by the user. Attributes such as TO DO, or importance can be defined in the history.

(6) Filer Function

This function is used for displaying a list form document files managed by the action managing software 104 together with actual data or shortcuts.

(7) Function for Internet Document

This function is used for managing information collected through the Internet. The collected information can be displayed in a linkage relation therebetween, and <TITLE> automatically obtained from HTML is used for a heading of the document.

(8) Scheduler Function

This function is used for executing ordinary schedule management other than the management according to time information in the action names described above. Schedule of a third person can also be referred to through the network.

(9) Function of Displaying Telop

This function is used for displaying on the screen information as a telop from the Internet, servers, or local disks.

Further, this function makes it possible to simultaneously send notices for urging members to send in some form or of the intra-corporation information in the intranet, and also to simultaneously make reports within a particular group.

Further, the application managing software 104 described above can also be used for distribution or execution of the program by being stored in a computer-readable recording medium such as a floppy disk, a CD-ROM, an MO, a DVD other than the hard disk drive 103.

As described above, the job execution managing apparatus according to the present invention comprises an information storing unit for defining a character string indicating a user's action to execute a job with given contents is defined as job information, the job information is prepared for a given number of an arbitrary number of jobs, the prepared job information is divided and stored in the forms of a first job information specifying execution of a particular application program and a second job information specifying the first job information, and further first relational information correlating the first job information to a corresponding particular application program and second relational information correlating the second job information to the first job information are stored; a display for reading out and displaying, of the first and second job information, prespecified first and/or second job information from the information storing unit; and a job execution control unit for providing, when the first job information displayed by the display is selected, controls over execution of a corresponding application program, referring to the first relational information, and also providing, when the second job information is selected, controls over display of the first job information referring to the second relational information, and for this reason, when the first job information is selected, a particular application program is immediately started for execution of the job, which makes it possible to improve the workability and operability. Accordingly, a work with a computer can be started only by selecting first job information, so that a user is not required to think which application program is the most suited to the job to be executed, which makes it possible to improve the workability. Also, as second job information is provided, a plurality of job information can efficiently be managed.

The job execution managing apparatus according to the present invention comprises an information storing unit for defining a character string indicating a user's job which the user must perform to carry out a job with given contents as job information, preparing the job information for each of an arbitrary number of jobs, classifying the prepared job information to first job information specifying execution of a particular application program and a document to be used and second job information specifying the first job information and storing the first and second job information, and also storing therein first relational information correlating the first job information to a corresponding particular application program as well as to a document to be used and second relational information correlating the second job information to the first job information; a display for reading out and displaying, of the first and second job information, prespecified first and/or second job information from the information storing unit; and a job execution control unit for providing, when the first job information displayed by the display is selected, controls over execution of a corresponding application program referring to the first relational information and using a corresponding document, and also providing, when the second job information is selected, controls over display of corresponding first job information referring to the second relational information, so that, when the first job information is selected, an application program which can immediately treat a document to be used is started with the document displayed to make the work ready for execution, which makes it possible to improve the workability and operability. Accordingly, as a user can start a work with a computer only by selecting the first job information, the user is not required to search for a destination for storage of a document used in a work, nor to think which application program is the most suited to a work to be executed, which makes it possible to improve the workability. Also as second job information is provided, a plurality of job information can efficiently be managed.

The job execution managing apparatus according to the present invention further comprises a display specifying unit for specifying whether the first and second job information should be displayed or not; and the display specifying unit displays only the second job information in a list form and appends display-selected information to second job information specified by a user of the second job information displayed in a list form, and the display unit displays second job information with the display-selected information appended thereto, so that whether the first and second job information are to be displayed on the screen or not can be selected by executing an operation for selection only once, which makes it possible to make the processing easier. The second job information is displayed at first by the display unit, but when the second job information is selected, the first job information is displayed on the screen according to the second relational information.

In the job execution managing apparatus according to the present invention; job execution information defining a sequence of execution of a corresponding application program is appended to the first job information, and the job execution managing unit provides controls over execution of a corresponding application program according to the job execution information, so that a user is not required to give instructions several times to a computer, and all of or a portion of the processing corresponding to the first job information can automatically be executed.

The job execution managing apparatus according to the present invention comprises an information storing unit for defining a character string indicating a user's job which the user should perform to carry out a job with given contents as job information, preparing the job information for an arbitrary number of jobs, classifying the job information to first job information specifying execution of particular application program, second job information specifying execution of a particular application program as well as a document to be used, and third job information specifying the first job information or second job information according to contents of a job corresponding to the prepared job information and storing the first, second, and third job information therein, and also storing therein the first relational information correlating the first information to a corresponding particular application program, second relational information correlating the second job information to a corresponding particular program as well as to a corresponding particular document, and third relational information correlation the third job information to the first or second job information; a display for reading out and displaying, of the first, second, and third job information, prespecified first, second, and/or third job information from the information storing unit; and a job execution control unit for providing, when the first job information displayed by the display is selected, controls over execution of a corresponding application program referring to the first relational information, providing, when the second job information is selected, controls over execution of a corresponding application program referring to the second relational information and using a corresponding document, and also providing, when the third relational information is selected, control over display of corresponding first or second job information referring to the third relational information, so that, when the first job information is selected, a particular application program is immediately activated to start a work, and also when the second job information is selected, an application program which can treat a document to be used is immediately activated, the document is displayed on the screen for starting the work, which makes it possible to improve the workability and operability. Accordingly, a user can start a work with a computer only by selecting the first and second job information, so that the user is not required to search for a destination of storage used for the work, nor to think which application program is the most suited to the work to be executed, which makes it possible to improve the workability. Also, as the third job information is provided, a plurality of job information can efficiently be managed.

The job execution managing apparatus according to the present invention further comprises a display specifying unit for specifying whether the first, second, and third job information should be displayed or not, and the display specifying unit displays only the third job information in a list form, and appends display-selected information to third job information selected by a user of the third job information displayed in a list form, and the display displays third display information with the display-selected information appended thereto, so that whether the first and second job information are to be displayed on the screen can be selected by executing an operation for selection only once which makes it possible to make the processing easier. Also the third job information is displayed by the display, but when the third job information is selected, the first or/and second job information are displayed on the screen according to the third job information.

With the job execution managing apparatus according to the present invention, job execution information defining a sequence of execution of a corresponding application program is appended to the first and second job information, and the job execution managing provides a control over execution of a corresponding application program according to the job execution information, so that a user is not required to give instructions to a computer several times, and all of or a portion of the processing corresponding to the first job information can automatically be executed by the computer.

With the readable recording medium according to the present invention, a program making a computer function as each units of the job execution managing apparatus according to the present invention is recorded therein, so that a user is not required to search for a destination where a document to be used for a work is stored, nor he has to think which application program is the most suited one for the work to be executed, which makes it possible to improve the workability.

This application is based on Japanese patent application No. HEI 9-145018 filed in the Japanese Patent Office on Jun. 3, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A job execution managing apparatus comprising:

an information storing unit for defining a character string indicating a user's job which the user must perform to carry out a job with given contents as job information, preparing therein said job information for each of an arbitrary number of jobs, classifying said prepared job information to first job information specifying execution of a particular application program and second job information specifying the first job information and storing the first and second job information, and also storing therein first relational information correlating the first job information to a corresponding particular application program and second relational information correlating the second job information to the first job information;

a display for reading out and displaying, of the first and second job information, prespecified first and/or second job information from the information storing unit; and a job execution control unit for providing, when said first job information displayed by the display is selected, controls over execution of a corresponding application program, referring to the first relational information, and also providing, when the second job information is selected, controls over display of the first job information referring to the second relational information.

2. A job execution managing apparatus comprising:

an information storing unit for defining a character string indicating a user's job which the user must perform to carry out a job with given contents as job information, preparing the job information for each of an arbitrary number of jobs, classifying said prepared job information to first job information specifying execution of a particular application program and a document to be used and second job information specifying the first job information and storing the first and second job information, and also storing therein first relational information correlating said first job information to a corresponding particular application program as well as to a document to be used and second relational information correlating said second job information to the first job information;

a display for reading out and displaying, of the first and second job information, prespecified first and/or second job information from the information storing unit; and a job execution control unit for providing, when said first job information displayed by the display is selected, controls over execution of a corresponding application program referring to the first relational information and using a corresponding document, and also providing, when said second job information is selected, controls over display of corresponding first job information referring to the second relational information.

3. A job execution managing apparatus according to claim 1 further comprising:

a display specifying unit for specifying whether the first and second job information should be displayed or not; wherein the display specifying unit displays only the second job information in a list form and appends display-selected information to second job information specified by a user of the second job information displayed in a list form, and the display displays second job information with the display-selected information appended thereto.

4. A job execution managing apparatus according to claim 2 further comprising:

a display specifying unit for specifying whether the first and second job information should be displayed or not; wherein the display specifying unit displays only the second job information in a list form and appends display-selected information to second job information specified by a user of the second job information displayed in a list form, and the display displays second job information with the display-selected information appended thereto.

5. A job execution managing apparatus according to claim 1; wherein job execution information defining a sequence of execution of a corresponding application program is appended to the first job information, and the job execution managing unit provides controls over execution of a corresponding application program according to the job execution information.

6. A job execution managing apparatus according to claim 2; wherein job execution information defining a sequence of execution of a corresponding application program is appended to the first job information, and the job execution managing unit provides controls over execution of a corresponding application program according to the job execution information.

7. A job execution managing apparatus comprising:

an information storing unit for defining a character string indicating a user's job which the user should perform to carry out a job with given contents as job information, preparing the job information for an arbitrary number of jobs, classifying the job information to first job information specifying execution of particular application program, second job information specifying execution of a particular application program as well as a document to be used, and third job information specifying the first job information or second job information according to contents of a job corresponding to the prepared job information and storing the first, second, and third job information therein, and also storing therein first relational information correlating the first information to a corresponding particular application program, second relational information correlating the second job information to a corresponding particular program as well as to a corresponding particular document, and third relational information correlating the third job information to the first or second job information;

a display for reading out and displaying, of the first, second, and third job information, prespecified first, second, and/or third job information from the information storing unit; and a job execution control unit for providing, when the first job information displayed by the display is selected, controls over execution of a corresponding application program referring to the first relational information, providing, when the second job information is selected, controls over execution of a corresponding application program referring to the second relational information and using a corresponding document, and also providing, when the third relational information is selected, controls over display of corresponding first or second job information referring to the third relational information.

8. A job execution managing apparatus according to claim 7 further comprising a display specifying for specifying whether the first, second, and third job information should be displayed or not; wherein the display specifying unit displays only the third job information in a list form, and appends display-selected information to third job information selected by a user of the third job information displayed in a list form; and the display displays third display information with the display-selected information appended thereto.

9. A job execution managing apparatus according to claim 7; wherein job execution information defining a sequence of execution of a corresponding application program is appended to the first and second job information, and the job execution managing unit provides controls over execution of a corresponding application program according to the job execution information.

10. A recording medium for storing a computer program defining a method of operating a job execution managing apparatus, said method comprising:

storing in an information storing unit a character string identifying as job information a user's job which the user must perform to carry out a job, said storing step further comprising:

preparing said job information for each of an arbitrary number of jobs, classifying said prepared job information into first job information for specifying execution of a particular application program and second job information for specifying the first job information, and storing the first and second job information as well as first relational information correlating the first job information to a corresponding particular application program and second relational information correlating the second job information to the first job information;

reading out and displaying, of the first and second job information, pre-specified stored first and/or second job information; and providing, when said first displayed job information is selected, controls over execution of a corresponding application program, referring to the first relational information, and also providing, when the second job information is selected, controls over display of the first job information referring to the second relational information.

11. A recording medium for storing a computer program defining a method of operating a job execution managing apparatus, said method comprising:

storing in an information storing unit a character string identifying as job information a user's job which the user must perform to carry out a job, said storing step further comprising:

preparing said job information for each of an arbitrary number of jobs, classifying said prepared job information into first job information for specifying execution of a particular application program and a document to be used, and second job information for specifying the first job information, and storing the first and second job information as well as first relational information correlating the first job information to a corresponding particular application program as well as a document to be used, and second relational information correlating the second job information to the first job information;

reading out and displaying, of the first and second job information, pre-specified stored first and/or second job information; and providing, when said first displayed Job information is selected, controls over execution of a corresponding application program, referring to the first relational information and using a corresponding document, and also providing, when the second job information is selected, controls over display of the first job information referring to the second relational information.

12. A recording medium with a method of operating a job execution managing apparatus according to claim 10 further comprising:
   specifying whether the first and second job information should be displayed or not,
   causing the displaying of only the second job information in a list form, and
   appending display-selected information to second job information specified by a user of the second job information displayed in a list form, and causing the displaying of second job information with the display-selected information appended thereto.

13. A recording medium with a method of operating a job execution managing apparatus according to claim 11 further comprising:
   specifying whether the first and second job information should be displayed or not,
   causing the displaying of only the second job information in a list form, and
   appending display-selected information to second job information specified by a user of the second job information displayed in a list form, and causing the displaying of second job information with the display-selected information appended thereto.

14. A recording medium with a method of operating a job execution managing apparatus according to claim 10 wherein job execution information defining a sequence of execution of a corresponding application program is appended to the first job information, and further comprises:
   controlling execution of a corresponding application program according to the job execution information.

15. A recording medium with a method of operating a job execution managing apparatus according to claim 11 wherein job execution information defining a sequence of execution of a corresponding application program is appended to the first job information, and further comprises:
   controlling execution of a corresponding application program according to the job execution information.

16. A recording medium for storing a computer program defining a method of operating a job execution managing apparatus, said method comprising:
   storing in an information storing unit a character string identifying as job information a user's job which the user must perform to carry out a job, said storing step further comprising
      preparing said job information for each of an arbitrary number of jobs,
      classifying said prepared job information into first job information for specifying execution of a particular application program, second job information for specifying execution of a particular application program and a document to be used, and third job information for specifying the first job information or the second job information according to the content of a job corresponding to the prepared information, and
      storing the first, second and third job information as well as first relational information correlating the first job information to a corresponding particular application program, second relational information correlating the second job information to a corresponding particular program as well as a document to be used, and third relational information correlating the third job information to the first or second job information;
   reading out and displaying, of the first, second and third job information, pre-specified stored first and/or second job information; and
   providing, when said first displayed job information is selected, controls over execution of a corresponding application program, referring to the first relational information, providing when said displayed second job information is selected, controls over execution of a corresponding application program, referring to the second relational information and using a corresponding document, and also providing, when the third job information is selected, controls over display of corresponding first or second job information referring to the third relational information.

17. A method of operating a job execution managing apparatus according to claim 16 further comprising:
   specifying whether the first and second job information should be displayed or not,
   causing the displaying of only the second job information in a list form, and
   appending display-selected information to second job information specified by a user of the second job information displayed in a list form, and causing the displaying of second job information with the display-selected information appended thereto.

18. A recording medium with a method of operating a job execution managing apparatus according to claim 16 further comprising:
   specifying whether the first, second or third job information should be displayed or not,
   causing the displaying of only the third job information in a list form, and
   appending display-selected information to third job information specified by a user of the third job information displayed in a list form, and causing the displaying of third job information with the display-selected information appended thereto.

19. A recording medium with a method of operating a job execution managing apparatus according to claim 16 wherein job execution information defining a sequence of execution of a corresponding application program is appended to the first and second job information, and further comprises:
   controlling execution of a corresponding application program according to the job execution information.

20. A method of operating a job execution managing apparatus, said method comprising:
   storing in an information storing unit a character string identifying as job information a user's job which the user must perform to carry out a job, said storing step further comprising:
      preparing said job information for each of an arbitrary number of jobs,
      classifying said prepared job information into first job information for specifying execution of a particular application program and second job information for specifying the first job information, and
      storing the first and second job information as well as first relational information correlating the first job information to a corresponding particular application program and second relational information correlating the second job information to the first job information;

reading out and displaying, of the first and second job information, pre-specified stored first and/or second job information; and providing, when said first displayed Job information is selected, controls over execution of a corresponding application program, referring to the first relational information, and also providing, when the second job information is selected, controls over display of the first job information referring to the second relational information.

21. The job execution managing apparatus as claimed in claim 1 wherein said specified program execution is of an application program that corresponds respectively to said first job information.

22. The job execution managing apparatus as claimed in claim 2 wherein said specified program execution is of an application program that corresponds respectively to said first job information.

23. The job execution managing apparatus as claimed in claim 7 wherein said specified program execution is of an application program that corresponds respectively to said first job information and of an application program that corresponds respectively to said second job information.

24. The recording medium as claimed in claim 10 wherein said specified program execution is of an application program that corresponds respectively to said first job information.

25. The recording medium as claimed in claim 11 wherein said specified program execution is of an application program that corresponds respectively to said first job information.

26. The recording medium as claimed in claim 16 wherein said specified program execution is of an application program that corresponds respectively to said first job information and of an application program that corresponds respectively to said second job information.

27. The method as claimed in claim 20 wherein said specified program execution is of an application program that corresponds respectively to said first job information.

* * * * *